US008880763B2

(12) United States Patent
Hata (10) Patent No.: US 8,880,763 B2
(45) Date of Patent: Nov. 4, 2014

(54) ELECTRONIC DEVICE

(75) Inventor: Yousuke Hata, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 712 days.

(21) Appl. No.: 12/912,182

(22) Filed: Oct. 26, 2010

(65) Prior Publication Data

US 2011/0119420 A1 May 19, 2011

(30) Foreign Application Priority Data

Nov. 13, 2009 (JP) ................................. 2009-260453

(51) Int. Cl.
| | | |
|---|---|---|
| G06F 3/00 | (2006.01) | |
| G06F 13/00 | (2006.01) | |
| H04N 1/00 | (2006.01) | |
| G06F 11/07 | (2006.01) | |
| G03G 15/00 | (2006.01) | |

(52) U.S. Cl.
CPC .... *G06F 11/0733* (2013.01); *H01N 2201/0094* (2013.01); *H04N 1/00952* (2013.01); *H04N 1/00* (2013.01); *G06F 11/0757* (2013.01); *G03G 15/55* (2013.01)
USPC .......................................... 710/110; 710/15

(58) Field of Classification Search
USPC ................... 710/110, 120, 15, 105
See application file for complete search history.

(56) References Cited

U.S. PATENT DOCUMENTS

| | | | | |
|---|---|---|---|---|
| 5,247,163 | A * | 9/1993 | Ohno et al. | 235/492 |
| 7,730,362 | B2 * | 6/2010 | Claus et al. | 714/47.2 |
| 2007/0150758 | A1 * | 6/2007 | Henderson et al. | 713/300 |

FOREIGN PATENT DOCUMENTS

| | | |
|---|---|---|
| CN | 1828573 A | 9/2006 |
| CN | 101083559 A | 12/2007 |
| JP | 2006-110150 A | 4/2006 |

OTHER PUBLICATIONS

Notification of First Office Action Appln. No. 201010546363.7—State Intellectual Property Office of the People's Republic of China, mailed Mar. 26, 2013.

* cited by examiner

*Primary Examiner* — Nimesh G Patel
(74) *Attorney, Agent, or Firm* — Fitzpatrick, Cella, Harper & Scinto

(57) ABSTRACT

A communication system enabling protection at times of serial communication failure without providing a watchdog timer for each of multiple slave control units is provided in a configuration in which a master control unit and multiple slave control units are connected by serial communication. A communication system provided with multiple slave control units 102 that perform transmission and reception of serial data with a master control unit 101 for controlling serial communication and a watchdog timer 105 that simultaneously resets the multiple slave control units 102 is configured such that a watchdog signal from the master control unit 101 is input to the watchdog timer 105 via at least one of multiple serial communication lines.

10 Claims, 9 Drawing Sheets

ELECTRONIC DEVICE

BACKGROUND OF THE INVENTION

1. Field of the Invention

The present invention relates to an electronic device having a master control unit and a slave control unit.

2. Description of the Related Art

In a multifunctional copier (so-called digital multifunction peripheral) having multiple functions such as copy, printer and facsimile functions, electrical components such as motors and fans required to operate the device are distributed throughout the chassis. To control these components, typically a control system is constituted by a control board serving as master and multiple control boards serving as slaves for controlling parts of the copier in coordination with the master control board. Recently, with such master-slave distributed control systems, serial communication has been used as the communication method between the master control board and the slave control boards. Using serial communication enables the number of signals to be cut, allowing for cost reductions due to the cut in wiring. With a master-slave distributed control system, a technique for protecting the system if a problem arises with a slave control board is essential.

As a technique for protecting a master-slave distributed control system, Japanese Patent Laid-Open No. 2006-110150, for example, discloses a configuration in which a master control unit and a slave control unit are connected by a communication line, and a watchdog timer that monitors the operation of the CPU on the slave side is provided in the slave control unit. In this configuration, the master control unit issues an initialization command to the watchdog timer of the slave control unit at a prescribed interval (e.g., 100 ms) via the communication line, and loads an initial countdown value (e.g., 3 sec). A reset signal output from this watchdog timer is connected to a reset terminal of the CPU on the slave side, and the CPU on the slave side is reset when the countdown reaches zero without the initial value being loaded due to a system error or the like.

With Japanese Patent Laid-Open No. 2006-110150, a watchdog timer for monitoring and resetting a slave control unit needs to be provided in each slave control unit if there are multiple slave control units. The number of watchdog timers and related peripheral circuit components is thus increased with an increase in the number of slave control units, resulting in cost increases. An increase in the number of components also increases the sources of trouble.

SUMMARY OF THE INVENTION

The present invention has been made in consideration of the related art and provides an electronic device that enables system protection in the case where a failure occurs in master-slave communication, without providing a watchdog timer for each slave control unit.

According to an aspect of the present invention, an electronic device is provided which comprises: an upper layer control unit that controls the electronic device; a first lower layer control unit and a second lower layer control unit that are controlled by the upper layer control unit; and a reset unit that resets the first and second lower layer control units, wherein the upper layer control unit transmits monitoring data indicating that communication is being performed normally to at least one of the first and second lower layer control units at a prescribed time interval, the at least one of the first and second lower layer control units inputs a monitoring signal to the reset unit in response to receiving the monitoring data, and the reset unit resets the first and second lower layer control units if a prescribed time elapses without the monitoring signal being input.

According to the present invention, a watchdog timer does not need to be provided for each slave control unit in an electronic device having a master control unit and multiple slave control units. The number of components can thereby be cut, thus enabling cost cutting and a reduction in the failure rate to be achieved.

Further features of the present invention will become apparent from the following description of exemplary embodiments with reference to the attached drawings.

DESCRIPTION OF THE EMBODIMENTS

First Embodiment

Configuration of Image Forming Apparatus

Figure 1:
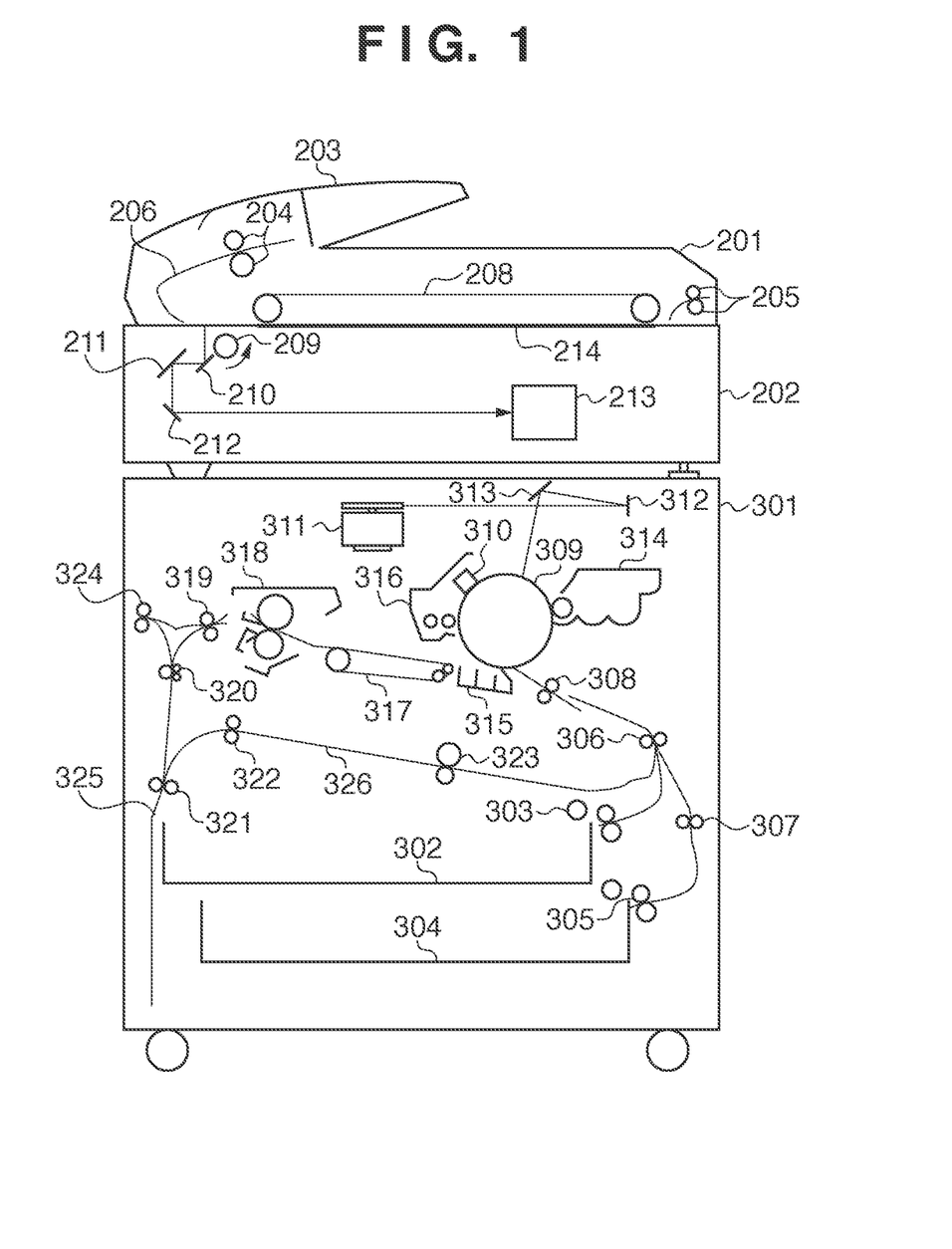
FIG. 1 is a schematic cross-sectional view of an image forming apparatus according to a First Embodiment of the present invention.

FIG. 1 is a schematic cross-sectional view for describing an image forming apparatus serving as an electronic device of a First Embodiment of the present invention. The configuration of the image forming apparatus according to the present embodiment and an image forming operation thereof will be described using FIG. 1. FIG. 1 shows the configuration of a digital multifunction peripheral having an image scanner (reading apparatus) and an electrophotographic printer (image reproduction apparatus) as an example of the image forming apparatus.

An original placed on an original placement unit 203 of an automatic original feeding apparatus 201 is separated and fed by feed rollers 204, and conveyed to a reading apparatus 202 via a conveying guide 206. The original is further conveyed at a constant speed by a conveying belt 208, and discharged to the outside by discharge rollers 205. An image illuminated with an illumination system 209 at a reading position of the reading apparatus 202 is converted to an image signal by an image reading unit 213 via an optical system composed of reflective mirrors 210, 211 and 212. The image reading unit 213 is composed of a lens, a CCD serving as a photoelectric conversion element, a drive circuit of the CCD, and the like. Original reading modes include a flow reading mode and a fixed mode. In the flow reading mode, the original is read while being conveyed at a constant speed relative to the stationary reading system (includes the illumination system 209 and the mirrors 210, 211 and 212). In the fixed mode, the original is placed on an original platen glass 214 of the reading apparatus 202 and read while moving the reading system at a constant speed. Normally, an original in sheet form is read in the flow reading mode and a stapled original is read in the fixed mode.

Image signals are reproduced page by page on recording sheets by an image reproduction apparatus 301 after being processed by an image processing unit 103 (not shown). Image signals are modulated into optical signals by a semiconductor laser (not shown) or the like. A modulated laser beam is exposed, via an optical scanning apparatus 311 using a polygon mirror, and mirrors 312 and 313, on a photosensitive drum 309 whose surface has been uniformly charged by a charging device 310, forming a latent image. The latent image is developed by toner in a developing device 314, and the toner image is transferred to a recording sheet by a transfer-separation device 315. Recording sheets are housed in sheet cassettes 302 and 304. Recording sheets from the sheet cassette 302 are fed by feed rollers 303, conveyed by conveying rollers 306, and conveyed to the transfer position of the photosensitive drum 309 after the timing with the image has been adjusted by registration rollers 308. On the other hand, recording sheets from the sheet cassette 304 are fed by feed rollers 305, conveyed by conveying rollers 307 and 306, and conveyed to the transfer position of the photosensitive drum 309 after the timing with the image has been adjusted by the registration rollers 308. The recording sheet to which the toner image has been transferred is conveyed to a fixing device 318 by a conveying belt 317, and the toner on the recording sheet is fixed.

When single-sided mode has been set, the recording sheet from the fixing device 318 is discharged to the outside by fixing-discharge rollers 319 and discharge rollers 324. If double-sided mode has been set, the recording sheet is conveyed from the fixing-discharge rollers 319 to a reverse path 325 by reverse rollers 321 via conveying rollers 320. Further, the recording sheet is reversed by reversing the rotation of the reverse rollers 321 immediately after the trailing edge of the recording sheet has passed the junction with a doubled-sided path 326. The recording sheet conveyed to the double-sided path is conveyed by rollers 322 and 323, and after the timing with the reverse side image has again been adjusted by the registration rollers 308 via the conveying rollers 306, the reverse side image is transferred and fixed to the recording sheet and the recording sheet is discharged to the outside.

Figure 2:
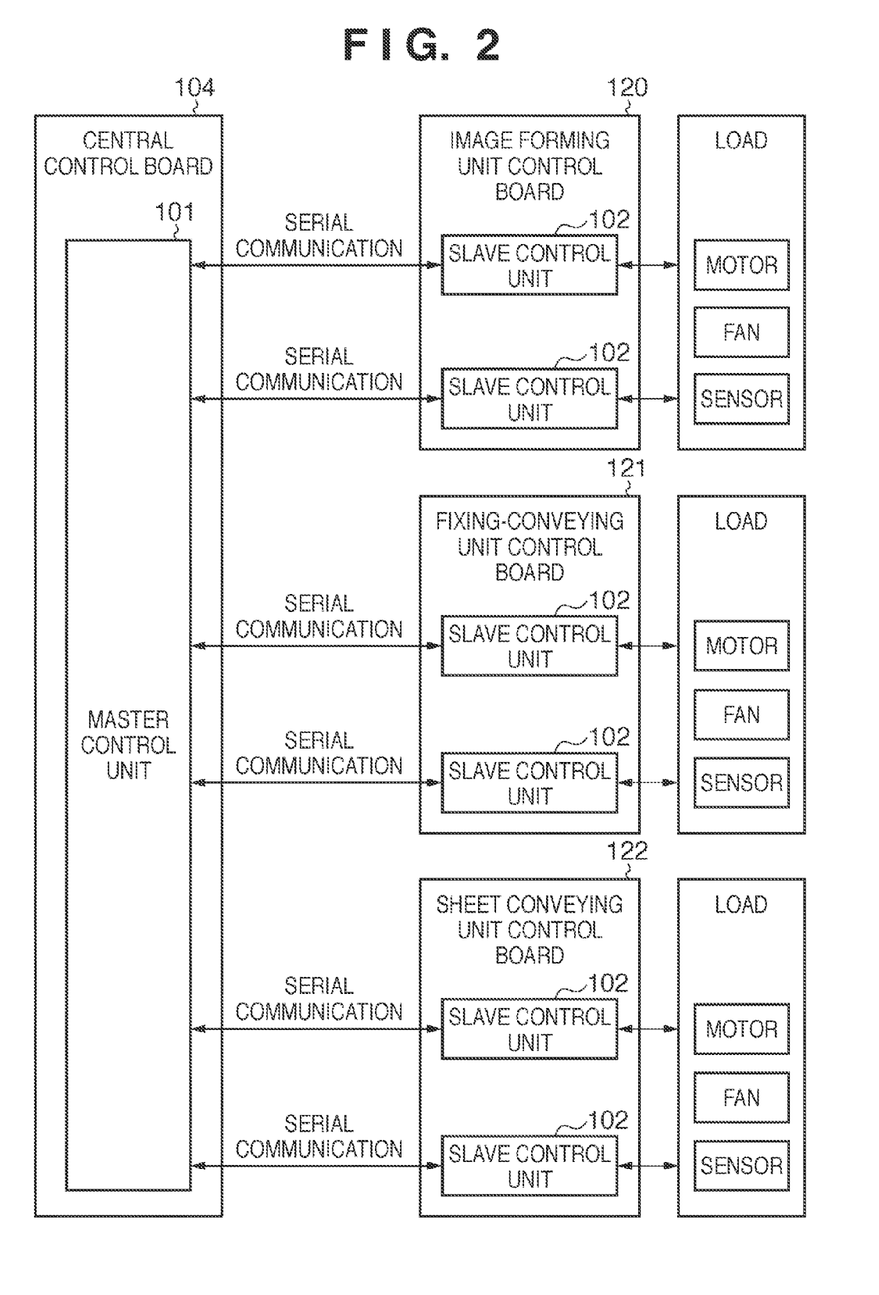
FIG. 2 is a block diagram of a control system of the image forming apparatus according to the First Embodiment of the present invention.

FIG. 2 is a block diagram of the control boards in the present embodiment. Overall control of the image forming apparatus in the present embodiment is constituted by a central control board 104, which is a control board serving as master (upper layer control unit), and an image forming unit control board 120, a fixing-conveying unit control board 121 and a sheet conveying unit control board 122, which are control boards serving as slaves (lower layer control units). Here, the sheet conveying unit control board 122 is responsible for control of sheet conveyance from the aforementioned sheet cassettes 302 and 304 to the registration rollers 308. The fixing-conveying unit control board 121 is responsible for control of sheet conveyance from the registration rollers 308 through to discharge and double-sided conveyance via transfer and fixing. The image forming unit control board 120 is responsible for control of the remaining units.

Master-Slave Communication System

Figure 3:
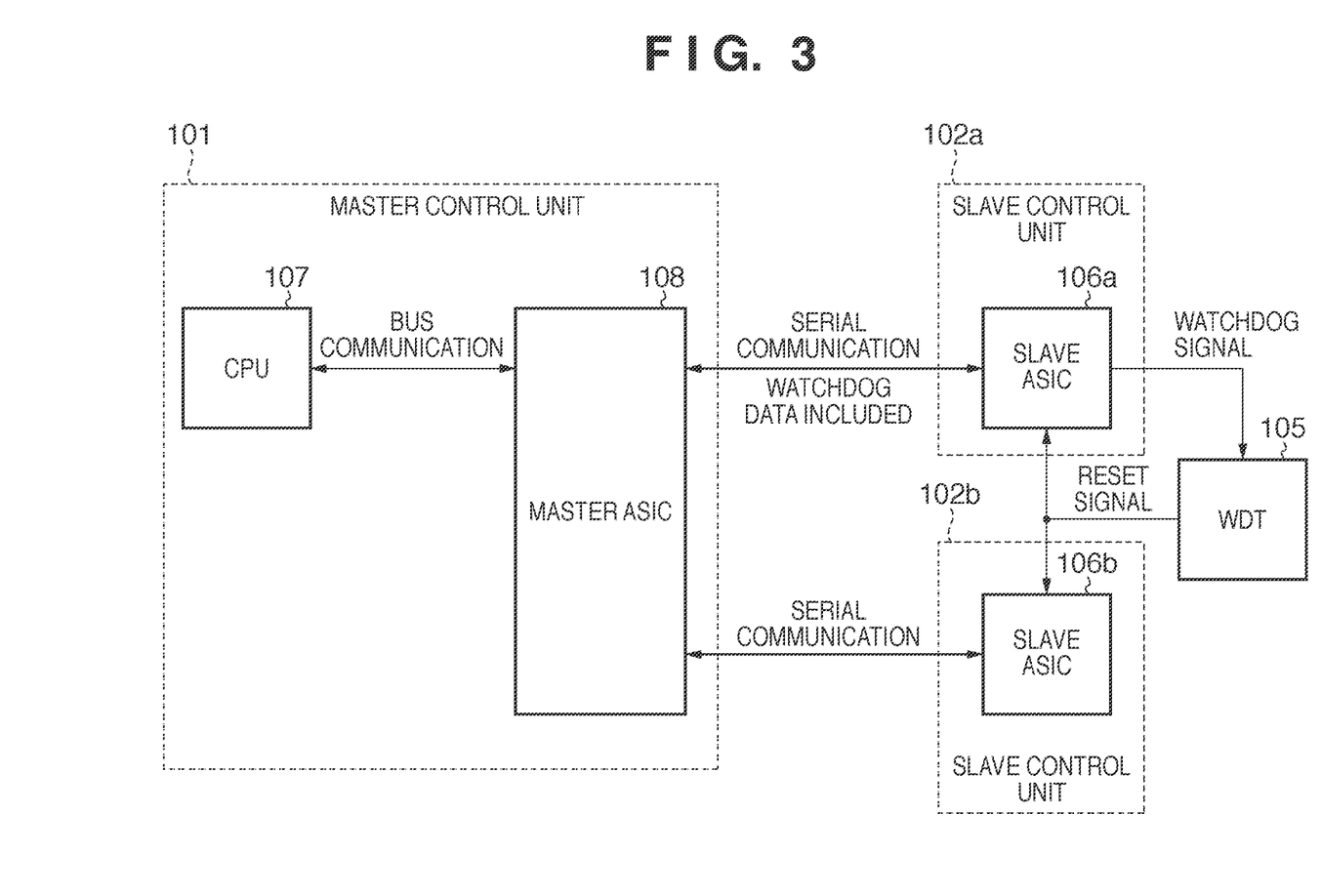
FIG. 3 is a schematic block diagram of a communication system according to the First Embodiment of the present invention.

A communication system constituted by a master control unit 101 (upper layer control unit) on the central control board 104 and two slave control units 102 (lower layer control units) on the image forming unit control board 120 within the image forming apparatus of the present embodiment will be described next with reference to FIG. 3. The master control unit 101 is constituted by a CPU 107 responsible for overall control of the device and a master ASIC 108 having a serial communication function. The slave control units 102a and 102b are constituted by respective slave ASICs 106a and 106b having a serial communication function with the master ASIC 108, and are respectively connected to the master ASIC 108. Also, a watchdog timer 105 (hereinafter WDT 105) that is able to simultaneously reset the two slave ASICs 106a and 106b is provided. A reset signal output from this WDT 105 is respectively connected to a reset terminal of the two slave ASICs 106a and 106b. Note that "watchdogging" is a monitoring mechanism, and "watchdogging" as disclosed in the embodiment section for embodying the invention can also be called "monitoring".

Further, the master ASIC 108 transmits watchdog data (monitoring data) using the communication line to the slave control unit 102a, out of the two serial communication lines to the slave control units 102a and 102b. The slave ASIC 106a, having received this watchdog data, outputs a watchdog signal (monitoring signal) based on the received watchdog data from an output port of the slave ASIC 106a, and inputs the watchdog signal to the WDT 105. The WDT 105 has a monitoring function of outputting a reset signal if the interval between watchdog signals from the slave ASIC 106a exceeds a prescribed time determined in advance. This reset signal, being connected to the reset terminal of the slave ASICs 106a and 106b, is able to reset these ASICs. The reset slave ASICs 106a and 106b are initialized, and the logic of the input and output ports of the slave ASICs 106a and 106b returns to an initial state. Accordingly, even if a heater or the like is on, for example, the heater or the like is initialized to an off or safe state.

As a specific example, in the present embodiment the WDT 105 is, for example, a down counter. The down counter is started when an initial value is set, and an expiration signal is output when the counter value reaches zero. The expiration signal is a reset signal to the slave control units. Also, with this configuration, the watchdog signal input from the slave ASIC 106a serves as a signal for loading the initial value to the WDT 105. That is, the load signal and initial value of the counter constitute the watchdog signal. Variations of this configuration are of course possible. Among other configurations that can be adopted, the WDT 105 itself can also have a function of loading the initial value when triggered by the watchdog signal, for example. Also, in the present embodiment, the multiple slave control units sharing the WDT 105 are placed on a single control board. This is because in the case where a failure occurs on a communication line connecting boards, an identical failure may possibly occur in slave control units provided on the same board. However, multiple slave control units placed on a single control board may be divided into multiple groups and a WDT shared in each group, or a WDT may be shared by multiple slave control units across multiple control boards. The number of sharing slave control units is of course not limited to two, and may be three or more.

Transmission of Watchdog Data

Figure 4:
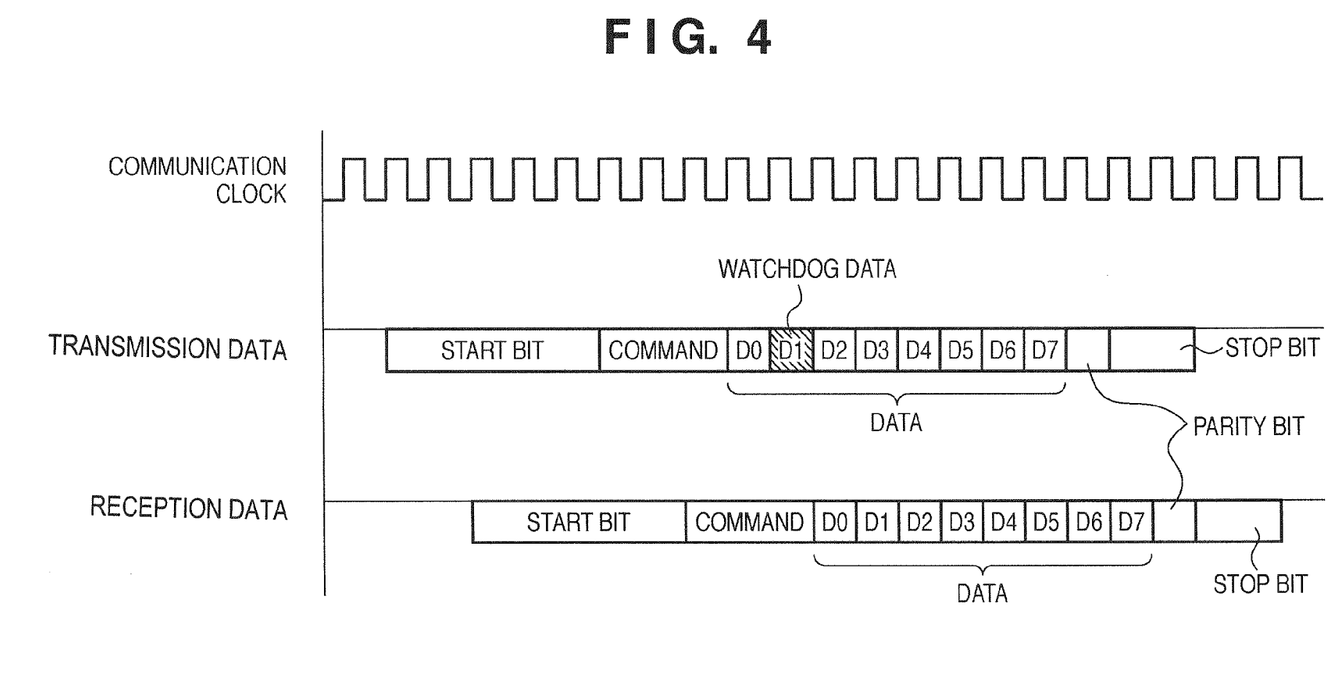
FIG. 4 is a schematic view for describing serial communication.

A watchdog data transmission method using serial communication will be described next. As shown in FIG. 4, serial communication between the master ASIC 108 and the slave ASICs 106 is constituted by three types of signals, namely, a communication clock, transmission data and reception data. With this serial communication, data transmission/reception is performed at fixed intervals. Further, transmission data and reception data are constituted by a start bit, a command, data, a parity bit and a stop bit, with the aforementioned watchdog data being put in the data segment thereof. For example, in the FIG. 4 example, watchdog data corresponds to D1 in the 8-bit transmission data. The master ASIC 108 puts watchdog data in this D1, and periodically transmits the data.

The slave control unit 102a, having received this watchdog data, inputs a watchdog signal based on the received watchdog data to the WDT 105. Accordingly, in the case where a physical problem occurs such as a disconnection on the communication line to the slave control unit 102a, both the slave control units 102a and 102b are automatically reset, because normal watchdog signals will no longer be input to the WDT 105. Also, in the case where a problem arises with the operation of the slave control unit 102a itself, both the slave control units 102a and 102b are automatically reset, because normal watchdog signals will no longer be input to the WDT 105. Here, when a problem arises with communication from the master control unit 101 to the slave control unit 102a or with the slave control unit 102a itself, the slave control unit 102b is also reset at the same time as the slave control unit 102a. At this time, the slave control unit 102b is reset even if communication from the master control unit 101 to the slave control unit 102b and the slave control unit 102b itself are normal. However, if a problem arises with even one of the multiple slave control units, the device is unable to operate normally, so resetting a normal slave control unit has no effect.

Next, system protection will be described in the case where a communication failure occurs with serial communication that does not include watchdog data, that is, serial communication to the slave control unit 102b that is not monitoring watchdog data. The master control unit 101 monitors serial communication with the slave control units including the slave control unit 102b, and, if there is a problem, stops transmission of watchdog data to the slave control unit 102a that is performed periodically under normal conditions. As a result, the WDT 105 inputs a reset signal to each slave control unit, resetting the slave control unit 102b and resolving any problem that may exist. Configurations and procedures will be described in detail hereinafter.

Figure 5:
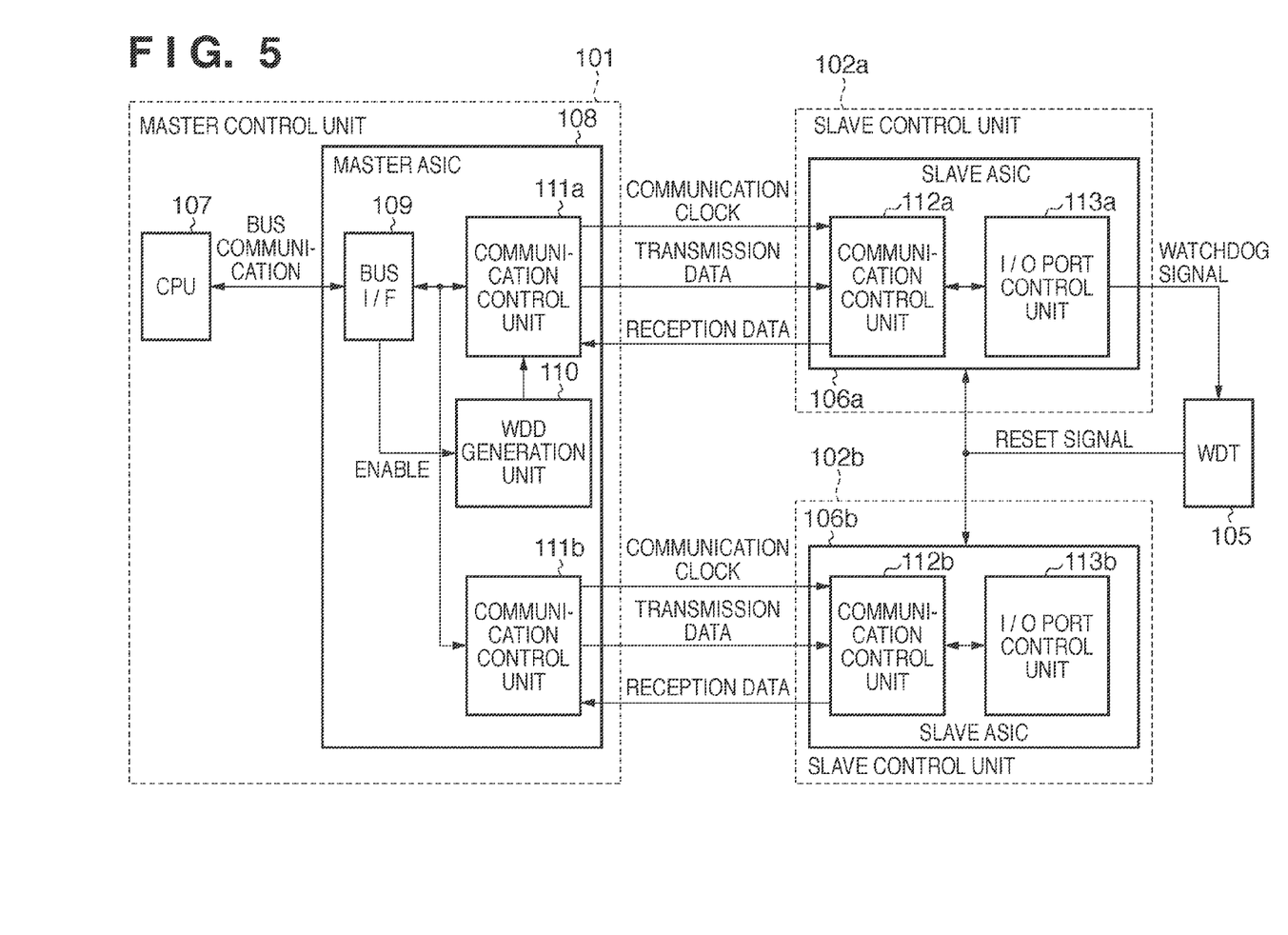
FIG. 5 is a block diagram of the communication system according to the First Embodiment of the present invention.

FIG. 5 is a more detailed block diagram of the communication system according to the present embodiment. The CPU 107 is connected to the master ASIC 108 by a bus. The CPU 107 controls communication control units 111a and 111b of the master ASIC 108 and a watchdog generation unit 110 (hereinafter, WDD generation unit 110) that generates watchdog data, via a bus I/F 109 of the master ASIC 108. This watchdog generation unit 110 generates a pulse signal having a predetermined cycle. That is, the watchdog generation unit 110 generates watchdog data at a prescribed time interval. This time interval need not be fixed, with any time interval being possible provided it enables input of a watchdog signal to the watchdog timer 105 before the watchdog timer 105 expires. The communication control units 111a and 111b within the master ASIC 108 are respectively connected to communication control units 112a and 112b within the slave ASICs 106a and 106b. The communication control units 112a and 112b are respectively connected to I/O port control units 113a and 113b. The slave ASIC 106a inputs a watchdog signal based on watchdog data from the master ASIC 108 to the WDT 105. The WDT 105 is connected to the reset terminal of the slave ASICs 106a and 106b.

Figure 6:
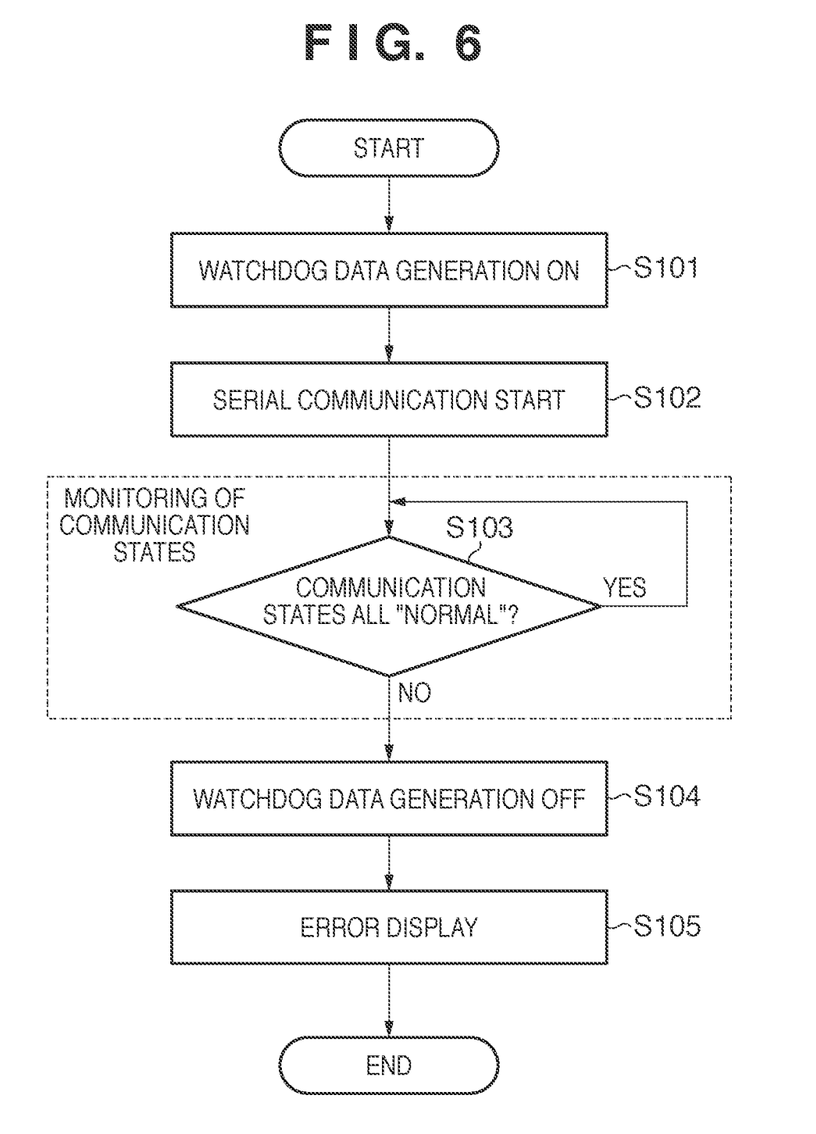
FIG. 6 is a flowchart for describing an example serial communication control by a CPU.

FIG. 6 is a control flow executed by the CPU 107 in the present embodiment. First, an original is input, and the CPU 107, after having entered an operational state, operates the WDD generation unit 110 (S101). Next, the CPU 107 starts the serial communication of the respective communication control units 111a and 111b (S102). There are two serial communication lines to the slave control units 102a and 102b, and while they can be set individually, here they are both enabled.

After communication has started, the CPU 107 continues monitoring the serial communication states. Monitoring of the serial communication states can be realized by monitoring a communication state monitoring bit corresponding to each serial communication, stored in a register within the master ASIC 108. If these serial communication states are both normal, the CPU 107 continues monitoring (Y at S103). If there is a problem with even one of the serial communications (N at S103), the CPU 107 immediately stops the operation of the WDD generation unit 110 (S104). Subsequently, error display is performed on a console unit or the like (S105). Since watchdog data is not transmitted to the slave ASIC 106a when the WDD generation unit 110 has entered a stopped state, watchdog signals are no longer input to the WDT 105. As a result, both the slave control units 102a and 102b are reset by the WDT 105. Accordingly, even if some sort of problem arises with the slave control unit 102b, both the slave control units 102a and 102b can be reliably reset.

Figure 7:
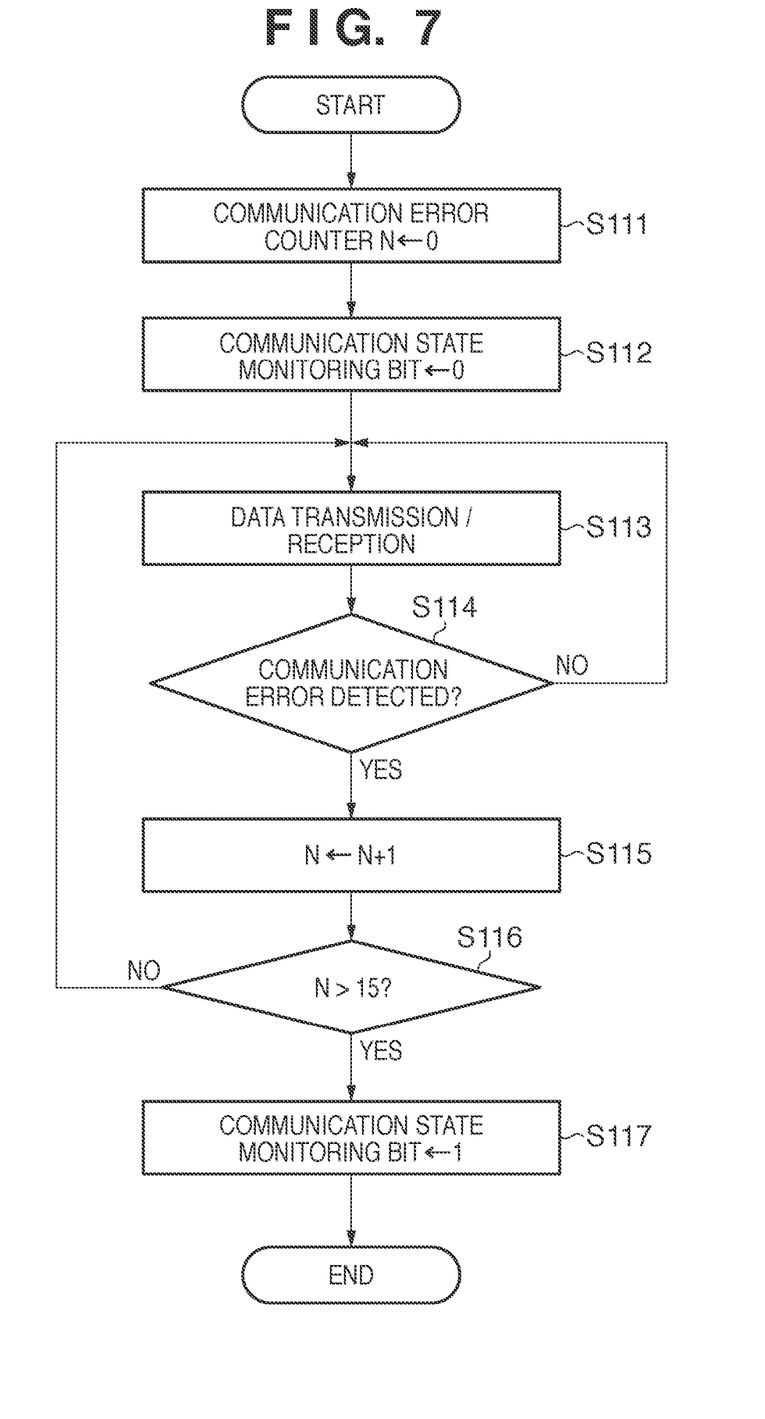
FIG. 7 is a flowchart for describing an example serial communication control by an ASIC.

FIG. 7 is a control flow of the master ASIC 108 and the slave ASICs 106 after serial communication has started. FIG. 7 is realized by a controller, dedicated hardware and the like in each ASIC.

When serial communication is started by the CPU 107, a communication error counter N is set to 0 (S111), and the communication state monitoring bit indicating the serial communication state is set to 0 (S112). Next, data transmission/reception between the master ASIC 108 and the slave ASICs 106 is started (S113). This data transmission/reception is repeated in terms of hardware at a predetermined cycle. After data transmission/reception is completed, it is determined whether a communication error has been detected (S114). A communication error is detected using the aforementioned parity bit or the like. Here, if the number of communication errors is at or below a prescribed frequency, data transmission/reception is retried, and when the prescribed frequency is exceeded, communication is determined to have failed, the communication state monitoring bit is set to 1, and the communication failure is notified. Here, if a communication error is not detected (N at S114), data transmission/reception is continued (S113). If a communication error is detected (Y at S114), the communication error counter N is incremented by 1 (S115). Next, it is determined whether the communication error counter N is greater than 15 (S116). If the communication error counter N is less than or equal to 15 (N at S116), data transmission/reception is continued (S114). However, if the communication error counter N is greater than 15 (Y at S116), the corresponding communication state monitoring bit is set to 1 (S117).

At step S103 of the procedure in FIG. 6, the CPU 107 is able to monitor the serial communication state by monitoring this communication state monitoring bit. Also, serial communication control is provided independently for each communication control unit, so when multiple communication control units are operating, the multiple communication control units execute this control flow in parallel.

As described above, with the communication system in the present embodiment, multiple slave control units 102 can be reliably reset when a communication failure occurs, by providing a single watchdog timer for the multiple slave control units. Accordingly, it is not necessary to provide watchdog timers for the individual slave control units, enabling watchdog timers and related circuit components to be cut, and cost reductions to be realized. Also, the present embodiment was described with a master control unit 101 and two slave control units 102 as an example, but the communication system of the present invention is naturally also applicable in the case of there being three or more connected slave control units 102.

Note that watchdog data may be data consisting of multiple bits, and may be transmitted using the command segment. Also, to ensure normality of the bidirectionality of serial communication, watchdog data may be transmitted bidirectionally between the master control unit 101 and the slave control unit 102a. In this case, firstly uplink watchdog data is transmitted from the slave control unit 102a to the master control unit 101 at a prescribed interval, and the master control unit, if able to receive the uplink watchdog data normally, transmits downlink watchdog data to the slave control unit 102a. The slave control unit 102a, having received the downlink watchdog data, transmits a watchdog signal to the WDT 105 and resets the WDT 105. In this case, the uplink and downlink watchdog data may be the same data or different data. Also, watchdog data, being data that conveys the fact that the serial communication states are all normal, can also be called communication state notification data, for example.

The present embodiment and other embodiments are described with serial communication as an example, but the present invention can also be applied to a communication system utilizing parallel communication. Also, the present invention can be applied in general to electronic devices that include control units having a master-slave configuration, rather than only to image forming apparatuses.

Second Embodiment

Figure 8:
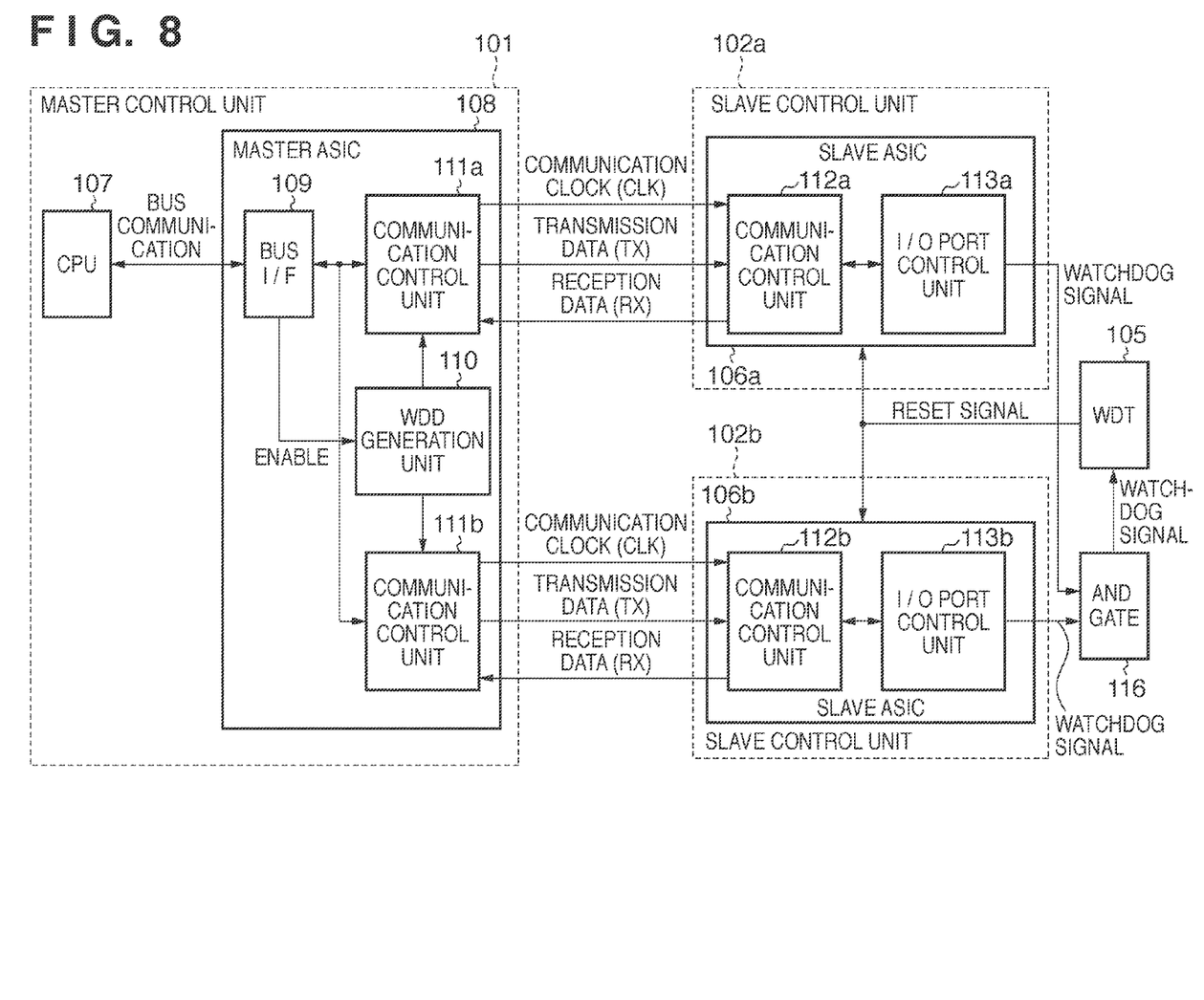
FIG. 8 is a block diagram of a communication system according to a Second Embodiment of the present invention.

Next, an image forming apparatus according to a Second Embodiment of the present invention will be described with reference to FIG. 8. Note that diagrams and reference numerals will be appropriated for description of sections that overlap with or are equivalent to the First Embodiment.

A communication system that forms part of the image forming apparatus is constituted by a single master control unit 101 and two slave control units 102a and 102b, and watchdog data generated by a WDD generation unit 110 is connected to respective communication control units 111a and 111b. Respective watchdog data is sent to slave ASICs 106a and 106b via respective serial communications. The slave control units 102a and 102b, having received the watchdog data, output watchdog signals based on the watchdog data from respective I/O port control units 113a and 113b. After being input to an AND gate 116 that takes the logical AND of these two output signals, the output thereof is input to a WDT 105. Accordingly, even if some sort of problem arises with the slave control unit 102a, both the slave control units 102a and 102b can be reliably reset. Similarly, even if some sort of problem arises with the slave control unit 102b, both the slave control units 102a and 102b can be reliably reset. Note that this assumes that the watchdog signals are positive logic.

In the present embodiment, if the watchdog signals include a load signal of the watchdog timer 105 and an initial value to be loaded, for example, the logical AND need only be taken of the load signals. The initial value can be stored in a register or can be statically generated by a circuit, for example. Alternatively, watchdog signals may serve as a trigger for the watchdog timer 105 to initialize itself.

Here, if the watchdog data sent to the slave ASICs 106a and 106b via the two respective serial communications is not synchronized, a problem may occur with the output when the logical AND is taken by the AND gate 116. This may occur even if the watchdog signals output from the respective slave ASICs 106a and 106b are normal, for example. For example, if the cycles are the same but the phases are opposite, the logical AND will end up being zero even if the respective watchdog signals are normal. Similarly, a similar problem is also envisaged in the case where the cycles differ. In view of this, in the present embodiment, a common watchdog data generation unit is used in order to avoid such problems. Naturally, a common WDD generation unit does not necessarily have to be used, because there is no problem as long as the watchdog data is synchronized.

As described above, watchdog data is put in the respective transmission data of two serial communications. The slave control units 102a and 102b then respectively output watchdog signals according to the watchdog data. If a configuration is adopted in which the logical AND of the watchdog signals output from the respective slave control units is taken and input to the WDT 105, the slave control units can be immediately reset in the case where a problem occurs with serial communication.

In the present embodiment, a configuration in which watchdog data is transmitted through both of two serial communications was described, but the same applies in the case where there are three or more serial communications. As long as watchdog data is put in all of three serial communications, for example, the logical AND of the watchdog signals output from the respective slave control units can be taken and input to the WDT 105. Also, if a configuration is adopted in which watchdog data is put in two of the three serial communications and not in the remaining serial communication, the same configuration as the present embodiment can be adopted with regard to the two serial communications that include watchdog data. The communication state of the remaining serial communication can be monitored by the CPU 107, and the WDD generation unit 110 can be stopped at the point at which a problem is detected, as shown in the First Embodiment.

Third Embodiment

Figure 9:
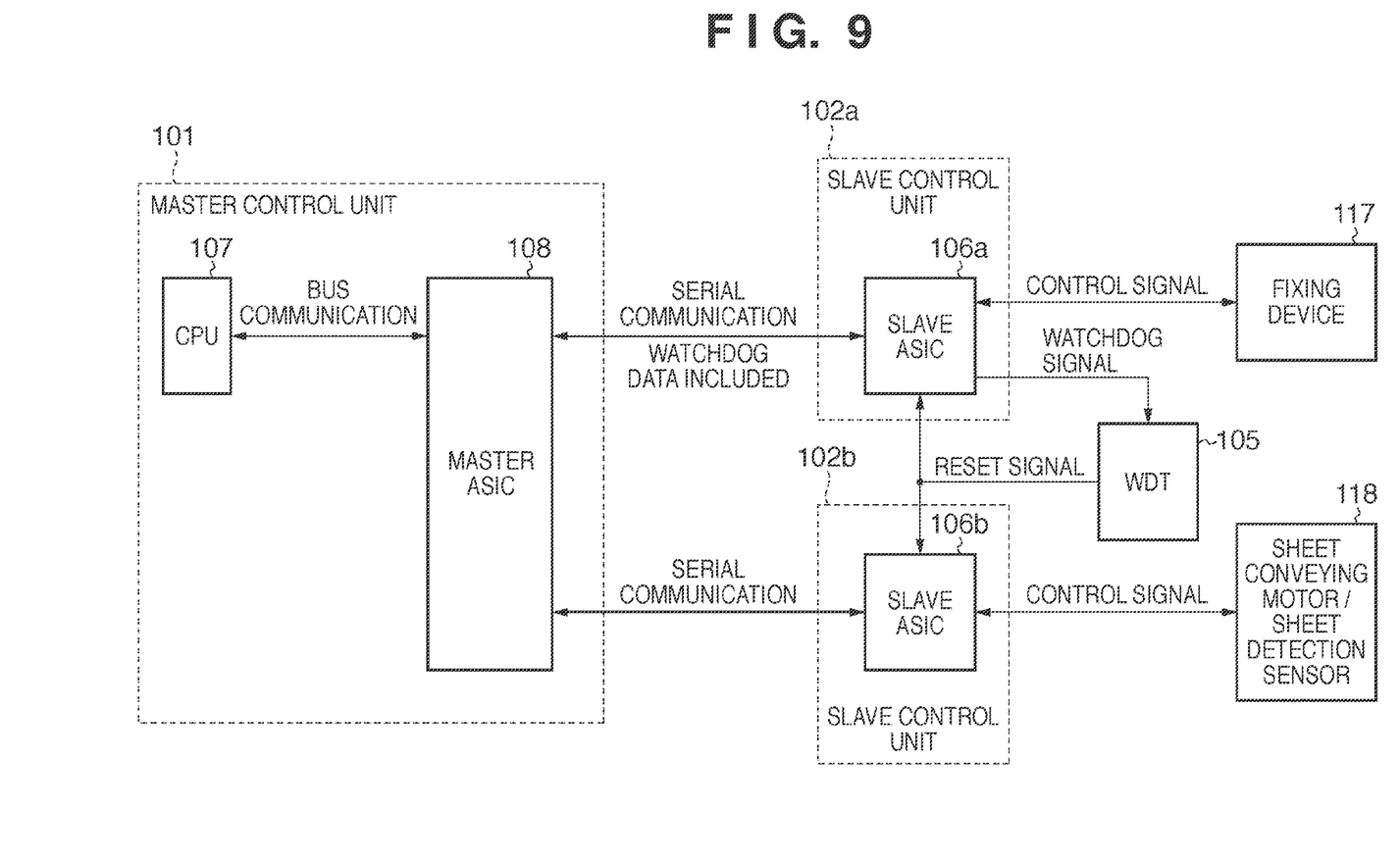
FIG. 9 is a block diagram of a communication system according to a Third Embodiment of the present invention.

An image forming apparatus according to a Third Embodiment of the present invention will be described next with reference to FIG. 9. Note that diagrams and reference numerals will be appropriated for description of sections that overlap with or are equivalent to the First and Second Embodiments.

The Third Embodiment will be described using a communication system constituted from a master control unit 101 on a central control board 104 and two slave control units 102a and 102b on a fixing-conveying unit control board 121. The control signal of a fixing device 117 is connected to a slave ASIC 106a of the slave control unit 102a, whose serial communication includes watchdog data. On the other hand, a sheet conveying motor and a sheet detection sensor for detecting sheets are connected to a slave ASIC 106b of the slave control unit 102b, whose serial communication does not include watchdog data.

As described in the First Embodiment, the time taken to perform resetting when a problem arises differs between the slave control unit 102a, whose serial communication includes watchdog data, and the slave control unit 102b, whose serial communication does not include watchdog data. If a problem arises with the serial communication of the slave control unit 102a, both the slave control units 102a and 102b are reset after the monitoring time of the WDT 105 elapses, because normal watchdog signals can no longer be input to the WDT 105 at this stage. In contrast, if a problem arises with the serial communication of the slave control unit 102b, the serial communication must firstly be continued until the communication state monitoring bit is set to 1. At the stage at which the communication state monitoring bit is set to 1, the CPU 107 detects a communication failure and stops the WDD generation unit 110. The slave control units 102*a* and 102*b* are reset after the monitoring time of the WDT 105 subsequently elapses. Accordingly, the time taken to perform resetting when a communication failure arises is shorter for the slave control unit 102*a* connected by serial communication that includes watchdog data.

In view of this, in the Third Embodiment, the loads controlled by the slave control units 102 are prioritized, and the higher priority load is preferentially connected to the slave control unit 102 connected by serial communication that includes watchdog data. Here, as the basis for prioritizing loads, priority is given to the load that will result in greater damage to equipment when there is a control problem. For example, the fixing device normally handles high power close to 1000 W and is controlled at high temperatures close to 200° C., thus the damage to equipment when a problem arises is of concern. Also, given that the temperature of on-demand fixing devices and electromagnetic induction fixing devices rises in a short period of time, these types of fixing device desirably are stopped as quickly as possible when a problem occurs. In view of this, the fixing device is connected to the slave control unit 102*a* connected by serial communication that includes watchdog data. On the other hand, the loads of the sheet conveying motor, sheet detection sensor and the like other than the fixing device are connected to the slave control unit 102*b* connected by serial communication that does not include watchdog data. More appropriate system protection can thus be realized by monitoring watchdog data using the slave control unit that needs to be reset with higher urgency after a problem arises.

As described above, in the present embodiment, after having prioritized the loads to be connected, the loads are connected to respective slave control units according to priority. Thus, equipment can be more safely protected, even in the case where the time taken to reset the slave control units 102 when a problem arises differs between serial communication that includes watchdog data and serial communication that does not include watchdog data. Also, in the present embodiment, loads are prioritized on the basis of the damage to equipment when there is a problem, but the preset invention is not limited thereto, and it is acceptable for loads to be prioritized on another basis.

Other Embodiments

Aspects of the present invention can also be realized by a computer of a system or apparatus (or devices such as a CPU or MPU) that reads out and executes a program recorded on a memory apparatus to perform the functions of the above-described embodiment(s), and by a method, the steps of which are performed by a computer of a system or apparatus by, for example, reading out and executing a program recorded on a memory apparatus to perform the functions of the above-described embodiment(s). For this purpose, the program is provided to the computer for example via a network or from a recording medium of various types serving as the memory apparatus (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-260453, filed Nov. 13, 2009, which is hereby incorporated by reference herein in its entirety.

What is claimed is:

1. An electronic device comprising:
   a first lower layer control unit;
   a second lower layer control unit;
   an upper layer control unit configured to communicate with the first lower layer control unit through a first communication line and communicate with the second lower layer control unit through a second communication line,
   wherein the first lower layer control unit and the second lower layer control unit are controlled by the upper layer control unit; and
   a reset unit configured to reset the first lower layer control unit and the second lower layer control unit,
   wherein the upper layer control unit is further configured to: (i) monitor communication through the first communication line and communication through the second communication line for failure, (ii) transmit monitoring data, indicating that communication is being performed normally, to at least one of the first lower layer control unit and the second lower layer control unit at a predetermined time interval when a failure is not found by monitoring the first communication line and the second communication line, and (iii) stop transmission of the monitoring data when a failure is found by monitoring the first communication line and the second communication line, and
   wherein one of the first lower layer control unit and the second lower layer control unit inputs a monitoring signal to the reset unit in response to receiving the monitoring data, and
   wherein the reset unit resets the first lower layer control unit and the second lower layer control unit if a prescribed time elapses without the monitoring signal being input.

2. The electronic device according to claim 1,
   wherein the upper layer control unit is further configured to transmit the monitoring data to the first lower layer control unit, without transmitting the monitoring data to the second lower layer control unit, and
   wherein the first lower layer control unit is further configured to input a monitoring signal to the reset unit in response to receiving the monitoring data, and
   wherein the reset unit is further configured to reset the first lower layer control unit and the second lower layer control unit if the prescribed time elapses without the monitoring signal being input.

3. The electronic device according to claim 2,
   wherein a reset priority of a load controlled by the first lower layer control unit is higher than a reset priority of a load controlled by the second lower layer control unit.

4. The electronic device according to claim 2,
   wherein the electronic device is configured to control an electrophotographic image forming apparatus, and
   wherein the first lower layer control unit controls a fixing device of the image forming apparatus, and the second lower layer control unit controls a load of the image forming apparatus other than the fixing device.

5. The electronic device according to claim 1,
   wherein the upper layer control unit transmits the monitoring data to the first lower layer control unit and the second lower layer control unit, and
   wherein the first lower layer control unit and the second lower layer control unit respectively output a monitoring signal in response to receiving the monitoring data, such that the monitoring signals respectively output by the first lower layer control unit and the second lower layer control unit are input to the reset unit via an AND gate, and wherein the reset unit resets the first lower layer control unit and the second lower layer control unit if the prescribed time elapses without a monitoring signal being input via the AND gate.

6. A controlling device, comprising:

a master controller;

a first slave controller configured to communicate with the master controller through a first communication line;

a second slave controller configured to communicate with the master controller through a second communication line; and a reset unit configured to reset the first slave controller and the second slave controller, wherein the master controller comprises:

a monitoring unit configured to monitor communications by the first slave controller and the second slave controller; and a watch dog data generator configured to generate watch dog data at a predetermined interval and transmit the generated watch dog data through the first communication line, wherein the watch dog data generator stops transmission of the watch dog data when a failure of communications by at least one of the first slave controller and the second slave controller is detected by the monitoring unit, and wherein the reset unit is configured to reset the first slave controller and the second slave controller when the watch dog data has not been transmitted from the master controller during a predetermined time period.

7. The device according to claim 6, wherein (i) communications through the first communication line and the second communication line are serial communications, and (ii) data transmitted in the serial communication includes a start bit, data, a parity bit, a stop bit, and the watch dog data.

8. The device according to claim 6, wherein the first slave controller and the second slave controller are mounted on the same board.

9. The device according to claim 6, wherein the master controller transmits the watch dog data via the second slave controller only.

10. The device according to claim 6, wherein the master controller stops transmission of (i) first watch dog data to be transmitted through the first communication line when a communication failure on the first communication line is detected by the monitoring unit, and (ii) second watch dog data to be transmitted through the second communication line when a communication failure on the second communication line is detected by the monitoring unit, and wherein the reset unit controls reset of the first slave controller and/or the second slave controller according to a logical product of the first watch dog data and the second watch dog data.

* * * * *